United States Patent [19]

Pearson

[11] 4,129,811

[45] Dec. 12, 1978

[54] EMERGENCY DOOR OPENING DEVICE

[76] Inventor: James E. Pearson, 81 Airport Rd., Peru, Ind. 46970

[21] Appl. No.: 845,269

[22] Filed: Oct. 25, 1977

[51] Int. Cl.² ............................................. H02P 1/04
[52] U.S. Cl. ...................................... 318/478; 49/31; 119/21; 307/66
[58] Field of Search ....................... 318/453, 478, 479; 307/64, 65, 66, 125; 98/39, 33 R; 49/31; 119/21, 112

[56] References Cited

U.S. PATENT DOCUMENTS

| | | | |
|---|---|---|---|
| 3,429,298 | 2/1969 | Thomason | 119/21 |
| 3,915,377 | 10/1975 | Sutton, Jr. | 236/49 |
| 3,973,173 | 8/1976 | Smith | 119/21 |

Primary Examiner—Robert K. Schaefer
Assistant Examiner—M. K. Mutter
Attorney, Agent, or Firm—Daniel Jay Tick

[57] ABSTRACT

A relay system maintains an emergency door opening device circuit open so that a door of a structure remains closed as long as an electrically energized ventilation system of the structure is supplied with electrical energy from a commercial power source. When the power fails, the relay system closes the emergency door opening device circuit, which includes its own power source, to operate a door opening device which opens a door to the structure to provide emergency ventilation for the structure.

1 Claim, 2 Drawing Figures

EMERGENCY DOOR OPENING DEVICE

BACKGROUND OF THE INVENTION

The present invention relates to an emergency door-opening device. More particularly, the invention relates to an emergency door-opening device for a structure housing animals and having a door and an electrically energized ventilation system supplied with electrical energy from a commercial power source for ventilating the structure.

Switching circuits for activating devices upon a power failure are disclosed in the following United States patents. McCord, No. 2,868,996, issued Jan. 13, 1959, Cady, No. 3,002,105, issued Sept. 26, 1961, Cady, No. 3,189,788, issued June 15, 1965, Sanders, No. 3,440,435, issued Apr. 22, 1969, Scholler, No. 3,454,781, issued July 8, 1969, Wilkinson, No. 3,769,571, issued Oct. 30, 1973, Beaman et al, No. 3,795,818, issued Mar. 5, 1974, Rich, No. 3,818,272, issued June 18, 1974, Godard et al, No. 3,863,123, issued Jan. 28, 1975, Funatsu et al, No. 3,898,474, issued Aug. 5, 1975, Zabroski, No. 3,976,986, issued Aug. 24, 1976 and Servos et al, No. 3,991,319, issued Nov. 9, 1976.

Objects of the invention are to provide an emergency door-opening device of simple structure, which is inexpensive in manufacture, installed with facility and convenience in new and existing structures, and especially in barns, chicken coops, and the like, housing domestic animals, poultry, and the like, and functions efficiently, effectively and reliably to provide emergency ventilation for a structure upon a power failure.

BRIEF DESCRIPTION OF THE DRAWINGS

In order that the invention may be readily carried into effect, it will now be described with reference to accompanying drawings, wherein.

DETAILED DESCRIPTION OF THE INVENTION

Figure 1:
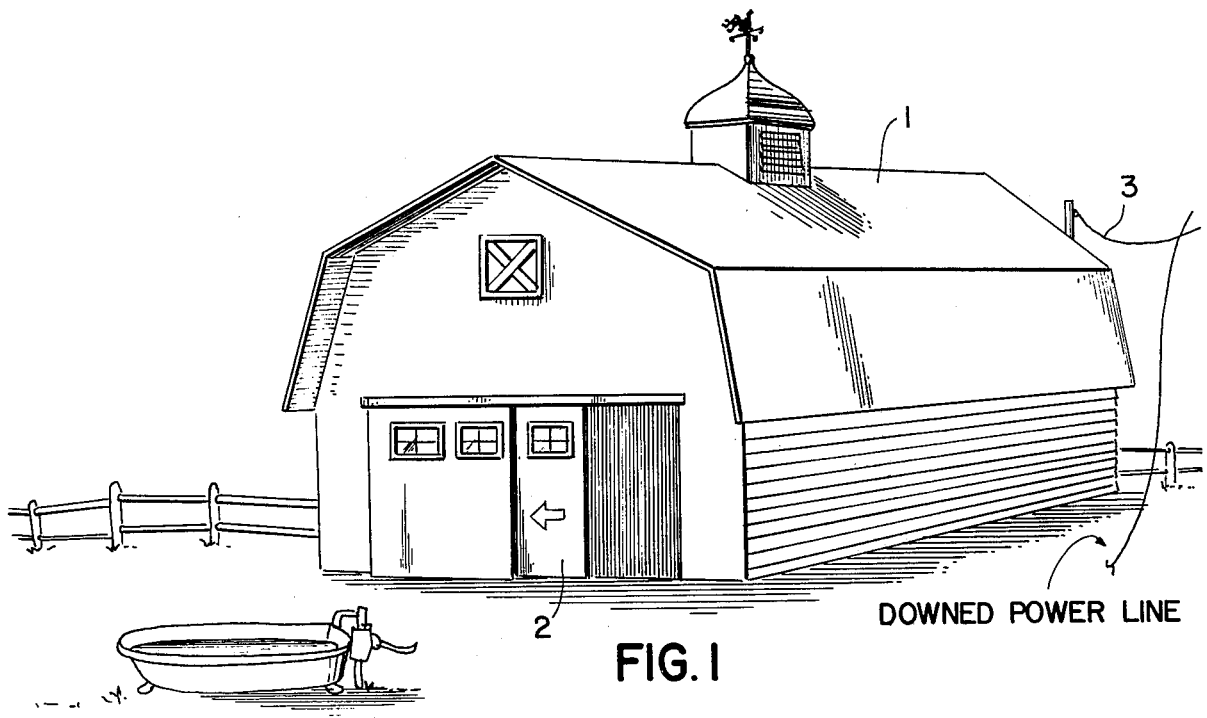
FIG. 1 is a perspective view of a structure having the emergency door-opening device of the invention installed therein.

The emergency door-opening device of the invention is for a structure 1, such as, for example, a barn, as shown in FIG. 1, housing animals and having a door 2 and an electrically energized ventilation system (not shown in the FIGS.) supplied with electrical energy from a commercial power source 3 (FIGS. 1 and 2) for ventilating the structure.

The emergency door-opening device of the invention comprises a door opening device 4 of any suitable type such as, for example, a gear and chain coupling arrangement, in operative proximity with the door 2 of the structure 1 for opening said door.

Figure 2:
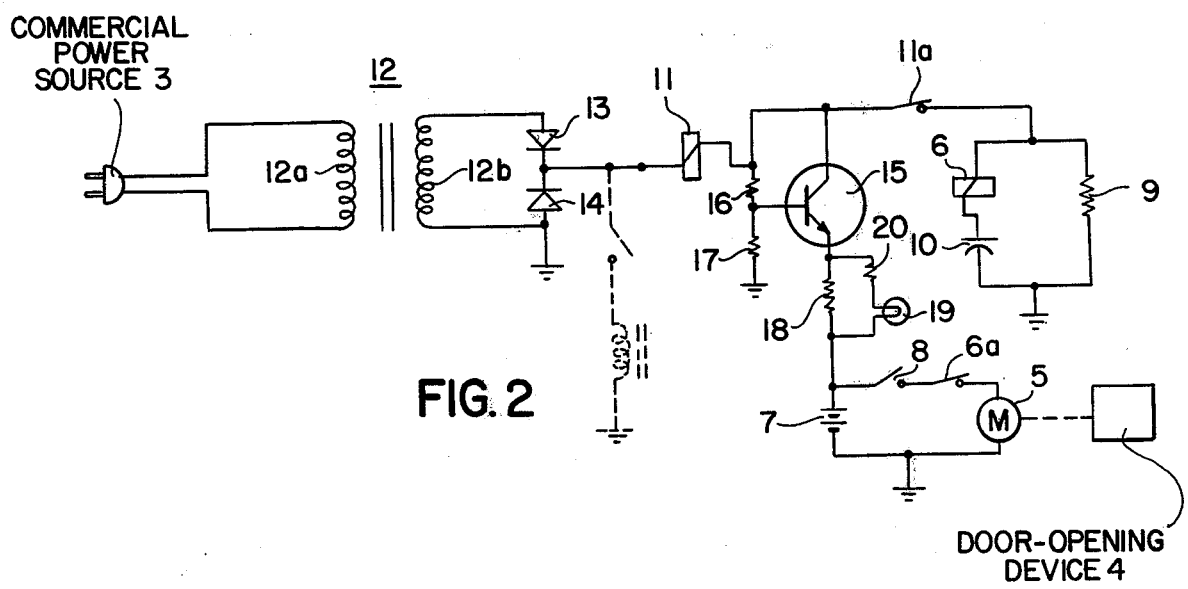
FIG. 2 is a circuit diagram of an embodiment of the emergency door-opening device of the invention.

As shown in FIG. 2, an electric motor 5 is coupled to the door opening device 4 for operating said door-opening device to open the door 2.

A first relay device has a first relay energizing winding 6 and a first relay switch 6a controlled in operation by said first relay energizing winding.

A motor control circuit comprises the first relay switch 6a, the motor 5 and a battery 7 connected in series circuit arrangement via an ON-OFF switch 8.

A time delay circuit of known type, including a resistor 9 and a capacitor 10, includes the first relay energizing winding 6.

A second relay device has a second relay energizing winding 11 and a second relay switch 11a controlled in operation by said second relay energizing winding. The second relay switch 11a is electrically connected in series with the second relay energizing winding 11 and is coupled through said second relay energizing winding to the power source. Thus, an input stepdown transformer 12 has a primary winding 12a connected to the commerical power source 3 and a stepdown secondary winding 12b connected to the second relay energizing winding 11 via a full wave rectifier comprising a pair of diodes 13 and 14. The second relay energizing winding 11 is connected in common to the cathodes of the diodes 13 and 14.

A battery charging circuit is electrically connected between the second relay energizing winding 11 and the battery 7 for charging the battery. The battery charging circuit comprises a transistor 15 having a base electrode connected to a common point in the connection between a pair of resistors 16 and 17. The resistor 16 is connected to a common point in the connection between the second relay energizing winding 11 and the second relay switch 11a and the resistor 17 is connected to a point at ground potential. The collector electrode of the transistor 15 is connected to a common point in the connection between the second relay energizing winding 11 and the second relay switch 11a and the emitter electrode of said transistor is connected to the motor control circuit, and more particularly, to the battery 7 thereof, via a resistor 18. An indicator lamp 19 and a resistor 20 are connected in shunt across the resistor 18 to indicate the energization of the battery charging circuit and thereby indicate the charging of the battery 7.

When power is supplied from the power source 3, the second relay energizing winding 11 is energized, closes the second relay switch 11a, charges the battery 7, and energizes the time delay circuit 9, 10 while keeping the first energizing winding 6 unenergized to maintain the first relay switch 6a open. This keeps the motor 5 deenergized and keeps the door-opening device 4 inoperative.

When the power fails, the second relay energizing winding 11 is deenergized, opens the second relay switch 11a and causes the time delay circuit 9, 10 to energize the first relay energizing winding 6 for a predetermined period of time after which said first relay energizing winding is deenergized. The energization of the first relay energizing winding 6 for the predetermined period of time closes the first relay switch 6a thereby causing the battery 7 to energize the motor 5 and operate the door-opening device to open the door. The predetermined period of time is sufficient to open the door 2, so that after said door has been opened, the first relay energizing winding 6 is deenergized and the motor control circuit is opened.

While the invention has been described by means of a specific example and in a specific embodiment, I do not wish to be limited thereto, for obvious modifications will occur to those skilled in the art without departing from the spirit and scope of the invention.

I claim:

1. An emergency door-opening device for a structure housing animals and having a door, and an electrically energized ventilation system supplied with electrical energy from a commercial power source for ventilating the structure, said emergency door-opening device comprising

- a door-opening device in operative proximity with the door of the structure for opening said door;
- a motor coupled to the door-opening device for operating said door-opening device to open said door;
- a first relay device having a first relay energizing winding and a first relay switch controlled in operation by said first relay energizing winding;
- a motor control circuit comprising the first relay switch, the motor and a battery connected in series circuit arrangement;
- a time delay circuit including the first relay energizing winding;
- a second relay device having a second relay energizing winding and a second relay switch controlled in operation by said second relay energizing winding, said second relay switch being electrically connected in series with said second relay energizing winding and coupled to the power source; and
- battery charging means electrically connected between the second relay energizing winding and the battery for charging the battery whereby when power is supplied from the power source the second relay energizing winding is energized, closes the second relay switch, charges the battery, and energizes the time delay circuit while keeping the first energizing winding unenergized to maintain the first relay switch open and the motor deenergized and the door-opening device inoperative and when the power fails the second relay energizing winding is deenergized, opens the second relay switch and causes the time delay circuit to energize the first relay energizing winding for a predetermined period of time after which said first relay energizing winding is deenergized and closes the first relay switch thereby causing the battery to energize the motor and operate the door-opening device to open the door.

* * * * *